(12) United States Patent  (10) Patent No.: US 9,291,636 B1
Otis et al.  (45) Date of Patent: Mar. 22, 2016

(54) METHODS AND SYSTEMS FOR DETECTING ACCELERATION USING BONDWIRES

(75) Inventors: Brian Patrick Otis, Seattle, WA (US); Yu-Te Liao, Taichung (TW); William James Biederman, Fox Island, WA (US)

(73) Assignee: University of Washington Through its Center for Commercialization, Seattle, WA (US)

( * ) Notice: Subject to any disclaimer, the term of this patent is extended or adjusted under 35 U.S.C. 154(b) by 566 days.

(21) Appl. No.: 13/070,076

(22) Filed: Mar. 23, 2011

Related U.S. Application Data

(60) Provisional application No. 61/316,784, filed on Mar. 23, 2010.

(51) Int. Cl.
  *G01P 3/42*  (2006.01)

(52) U.S. Cl.
  CPC ........................................ *G01P 3/42* (2013.01)

(58) Field of Classification Search
  CPC ... G01P 15/00; G01P 15/032; G01P 2015/02; G01P 2015/00
  USPC ............. 324/207.11–207.17, 207.24, 207.26, 324/228, 260, 691–724, 125, 162; 73/488, 73/514.01
  See application file for complete search history.

(56) References Cited

U.S. PATENT DOCUMENTS

| | | | |
|---|---|---|---|
| 3,057,208 A * | 10/1962 | Bedford | 73/514.29 |
| 4,418,774 A * | 12/1983 | Whitney et al. | 177/210 FP |
| 5,763,783 A * | 6/1998 | Asada | G01P 15/18 73/514.31 |
| 2007/0205849 A1* | 9/2007 | Otis | 333/187 |
| 2007/0215044 A1* | 9/2007 | Yamazawa | 118/665 |
| 2008/0236283 A1* | 10/2008 | Higuchi et al. | 73/514.34 |
| 2010/0194407 A1* | 8/2010 | Nakatani | 324/660 |
| 2011/0100126 A1* | 5/2011 | Jeong et al. | 73/514.32 |
| 2011/0230745 A1* | 9/2011 | Chandrasekaran et al. | 600/372 |

OTHER PUBLICATIONS

Y.-T. Liao, W. Biederman, and B. Otis, A CMOS Accelerometer Using Bondwire Inertial Sensing, Jun. 16-18, 2009, Department of Electrical Engineering, University of Washington, Seattle, WA 98195, IEEE Xplore Digital Library, 2009 Symposium on VLSI Circuits Digest of Technical Papers, pp. 64-65.*

(Continued)

*Primary Examiner* — Patrick Assouad
*Assistant Examiner* — Demetrius Pretlow
(74) *Attorney, Agent, or Firm* — McDonnell Boehnen Hulbert & Berghoff LLP (57) ABSTRACT

Disclosed herein are example methods, systems, and devices involving electrically-conductive wires, such as standard IC bonding wires, that are configured so as to operate as inertial sensors. One embodiment of the disclosed methods, systems, and devices may take the form of a system that includes a first electrically-conductive wire and a second electrically-conductive wire, where the first wire and the second wire are electromagnetically coupled; and a sensor oscillator, where the sensor oscillator is coupled to the first wire and the second wire, and where the sensor oscillator is configured to output a sensor-oscillator signal that is frequency modulated based on a change in complex impedance between the first wire and the second wire, where the change in complex impedance is due to a displacement of the first wire relative to the second wire.

20 Claims, 5 Drawing Sheets

(56) References Cited

OTHER PUBLICATIONS

Thomas F. Marinis & Joseph W. Soucy, Design and Characterization of Wirebonds for Use in High Shock Environments, May 26-29, 2009, Electronic Components and Technology Conference, 2009. ECTC 2009. 59th, May 26-29, 2009.*
Craninckx, J., A 1.8-GHz CMOS Low-Phase-Noise Voltage-Controlled Oscillator with Prescaler, Dec. 1995, Solid-State Circuits, IEEE Journal of (vol. 30 , Issue: 12) ,pp. 1474-1482.*
F. Alimenti , P. Mezzanotte , L. Roselli and R. Sorrentino "Modeling and characterization of the bonding-wire interconnection", IEEE Trans. Microw. Theory Tech., vol. 49, No. 1, pp. 142-150 2001.*
Seiko Instruments. 2009. http://datasheet.sii-ic.com/en/voltage_regulator/S11L10_E.pdf.
http://web.archive.org/web/20100527093428/http://wireless.fcc.gov/services/index.htm?job=service_home&id=medical_implant. 2009.
R.R. Harrison, et al., "A Low-Power Integrated Circuit for a Wireless 100-Electrode Neural Recording System," IEEE Journal of Solid-State Circuits, vol. 42, pp. 123-133, Jan. 2007.
J. Holleman and B. Otis, "A Sub-Microwatt Low-Noise Amplifier for Neural Recording," in Proc. IEEE Engineering in Medicine and Biology Society Conference, pp. 3930-3933, Aug. 2007.
W. Wattanapanitch, M. Fee, R. Sarpeshkar, "An Energy-Efficient Micropower Neural Recording Amplifier," IEEE Transactions on Biomedical Circuits and Systems, vol. 1, pp. 136-147, Jun. 2007.
J. L. Bohorquez, J. L. Dawson, A. P. Chandrakasan, "A 350 µW CMOS MSK transmitter and 400 µW OOK super-regenerative receiver for Medical Implant Communications," IEEE Symposium on VLSI Circuits, pp. 32-33, Jun. 2008.
C. Moritz, S. Perlmutter, and E. Fetz, "Direct control of paralysed muscles by cortical neurons," Nature, vol. 456, No. 7222, pp. 639-642, 2008.
S. Rai, J. Holleman, J. Pandey, F. Zhang, and B. Otis, "A 500 µw neural tag with 2 µvrms AFE and frequency multiplying MICS/ISM FSK transmitter," in Solid-State Circuits Conference, 2009. Digest of Technical Papers. ISSCC. 2009 IEEE, 2009.
A. Sodagar, G. E. Perlin, Y. Yao, K. Najafi, K. D. Wise, "An Implantable 64-Channel Wireless Microsystem for Single-Unit Neural Recording," IEEE Journal of Solid-State Circuits, vol. 44, No. 9, Sep 2009.
http://edocket.access.gpo.gov/cfr_2008/octqtr/47cfr15.242.htm, 2008.
http://encounternet.net/ , printed Jun. 2013.
B. Hofmann, "General purpose telemetry for analog biomedical signals," IEEE Engineering in Medicine and Biology Magazine, vol. 14, Issue 6, Nov.-Dec. 1995 pp. 772-775.
Bohorquez et al., "A 350W CMOS MSK transmitter and 400 W OOK super-regenerative receiver for medical implant communications," IEEE Journal of Solid-State Circuits, vol. 44,Issue 4,Apr. 2009 pp. 1248-1259.
P. Bradley, "An ultra low power, high performance medical implant communication system (MICS) transceiver for implantable devices," IEEE Biomedical Circuits and Systems (BioCAS), 2006, 158-161.
J. Bae, Namjun Cho, H-J Yoo, "A 490 µW fully MICS compatible FSK transceiver for implantable devices," IEEE symposium on VLSI Circuits, Jun. 2009, 36-37.
T. Melly, A.-S Porret, C.C. Enz, E.A. Vittoz,"An ultralow-power UHF transceiver integrated in a standard digital CMOS process: transmitter," IEEE Journal of Solid-State Circuits, vol. 36, Issue 3, Mar. 2001 pp. 467-472.
D. Yeager, F. Zhang, A. Zarrasvand, B. P. Otis "A 9.2 µA Gen2 compatible UHF RFID sensing tag with -12 dBm sensitivity and 1.25 µVrms input-referred noise floor," IEEE International Solid-State Circuits Conference (ISSCC), Feb. 2010, 52-54.
S. Roundy, E.S. Leland, J. Baker, E. Carleton, E. Reilly, E. Lai, B. Otis, J.M. Rabaey, P.K. Wright, V. Sundarara jan, "Improving power output for vibration based energy scavengers," IEEE Pervasive Computing, vol. 4, Issue 1, pp. 28-36, Jan.-Mar. 2005.

Y.-H. Liu, H.-H. Liu; T.-H. Lin, "A super-regenerative ASK receiver with ΔΣ pulse-width digitizer and SAR-based fast frequency calibration for MICS applications," IEEE symposium on VLSI Circuits, Jun. 2009, 38-39.
w3.antd.nist.gov/ban/15-08-0519-01-0006.pdf , 2008.
A.-S. Porret, T. Melly, D. Python, C.C. Enz, E.A. Vittoz,"An ultra low-power UHF transceiver integrated in a standard digital CMOS process: architecture and receiver," IEEE Journal of Solid-State Circuits, vol. 36,Is-sue 3, Mar. 2001 pp. 452-466.
W. Zhuo, X. Li, S. Shekhar, S.H.K. Embabi, J.P. de Gyvez, D.J. Allstot, E. Sanchez-Sinencio, "A capacitor cross-coupled common-gate low-noise amplifier," IEEE Transactions on Circuits and Systems II: Express Briefs, vol. 52, Issue 12, Dec. 2005 pp. 875-879.
B. Otis, 400 µW-RX, 1.6 mW-TX super-regenerative transceiver for wireless sensor networks IEEE International Solid State Circuits Conference (ISSCC), Feb. 2005, 396-398.
E.A. Vittoz, M.G.R. Degrauwe, S. Bitz, "High-performance crystal oscillator circuits: theory and application," IEEE Journal of Solid-State Circuits, vol. 23, Issue 3, Jun. 1988 pp. 774-783.
A.J. Johansson, "Performance of a radio link between a base station and a medical implant utilizing the MICS standard," IEEE International Conference on Engineering in Medicine and Biology Society, 2004, vol. 1, Sep. 1-5, 2004 pp. 2113-2116.
P. Kinget, R. Melville, D. Long, V. Gopinathan, "An injection-locking scheme for precision quadrature generation," IEEE Journal of Solid-State Circuits, vol. 37, Issue 7, Jul. 2002 pp. 845-851.
G. Chien, P.R. Gray, "A 900 MHz local oscillator using a DLL-based frequency multiplier technique for PCS applications," IEEE Journal of Solid-State Circuits, vol. 35, Issue 12, Dec. 2000 pp. 1996-1999.
I.A.W. Vance, "Fully integrated radio paging receiver." IEE Proceedings Communications, Radar and Signal Processing, vol. 129, Issue 1, Feb. 1982 pp. 2-6.
N. Barbour and G. Schmidt, "Inertial sensor technology trends," Sensors Journal, IEEE, vol. 1, No. 4, pp. 332-339, Dec. 2001, 332-339.
N. Yazdi, F. Ayazi, and K. Najafi, "Micromachined inertial sensors," Proceedings of the IEEE, vol. 86, No. 8, pp. 1640-1659, Aug. 1998.
Paavola, M. Kamarainen, J. Jarvinen, M. Saukoski, M. Laiho, and K. Halonen, "A micropower interface ASIC for a capacitive 3-axis micro-accelerometer," Solid-State Circuits, IEEE Journal of, vol. 42, No. 12, pp. 2651-2665, Dec. 2007.
C. Hindrichsen, N. Almind, S. Brodersen, O. Hansen, and E. Thomsen, "Analytical model of a PZT thick-film triaxial accelerometer for optimum design," Sensors Journal, IEEE, vol. 9, No. 4, pp. 419-429, Apr. 2009.
B. Bhola and W. Steier, "A novel optical microring resonator accelerometer," Sensors Journal, IEEE, vol. 7, No. 12, pp. 1759-1766, Dec. 2007.
G. H. Ames and J. M. Maguire, "Erbium fiber laser accelerometer," Sensors Journal, IEEE, vol. 7, No. 4, pp. 557-561, Apr. 2007.
C.-H. Liu and T. Kenny, "A high-precision, wide-bandwidth micromachined tunneling accelerometer," Microelectromechanical Systems, Journal of, vol. 10, No. 3, pp. 425-433, Sep. 2001.
H. Takao, H. Fukumoto, and M. Ishida, "A CMOS integrated three-axis accelerometer fabricated with commercial submicrometer CMOS technology and bulk-micromachining," Electron Devices, IEEE Transactions on, vol. 48, No. 9, pp. 1961-1968, Sep. 2001.
B. Amini, R. Abdolvand, and F. Ayazi, "A 4.5-mW closed-loop ΔΣ micro-gravity CMOS SOI accelerometer," Solid-State Circuits, IEEE Journal of, vol. 41, No. 12, pp. 2983-2991, Dec. 2006.
M. Lemkin and B. Boser, "A three-axis micromachined accelerometer with a CMOS position-sense interface and digital offset-trim electronics," Solid-State Circuits, IEEE Journal of, vol. 34, No. 4, pp. 456-468, Apr. 1999.
T. Marinis and J. Soucy, "Design and characterization of wirebonds for use in high shock environments," in Electronic Components and Technology Conference, 2009. ECTC 2009. 59th, May 2009, pp. 1414-1422.
H.A. Schafft, "Testing and fabrication of wire-bond electrical connections: a comprehensive survey," U.S. National Bureau of Standards, 1973, 1-127.

(56) References Cited

OTHER PUBLICATIONS

F. Alimenti, P. Mezzanotte, L. Roselli, and R. Sorrentino, "Modeling and characterization of the bonding-wire interconnection," Microwave Theory and Techniques, IEEE Transactions on, vol. 49, No. 1, pp. 142-150, Jan. 2001.

B. Boser and R. Howe, "Surface micromachined accelerometers," Solid-State Circuits, IEEE Journal of, vol. 31, No. 3, pp. 366-375, Mar. 1996.

D. Leeson, "A simple model of feedback oscillator noise spectrum," Proceedings of the IEEE, vol. 54, No. 2, pp. 329-330, Feb. 1966.

S. Zhou and M.-C. Chang, "A CMOS passive mixer with low flicker noise for low-power direct-conversion receiver," Solid-State Circuits, IEEE Journal of, vol. 40, No. 5, pp. 1084-1093, May 2005.

N. El-Sheimy, H. Hou, and X. Niu, "Analysis and modeling of inertial sensors using allan variance," Instrumentation and Measurement, IEEE Transactions on, vol. 57, No. 1, pp. 140-149, Jan. 2008.

B. Otis, C. Moritz, J. Holleman, A. Mishra, J. Pandey, S. Rai, D. Yeager, F. Zhang, "Circuit techniques for wireless brain interfaces," IEEE Conf. on Engineering in Medicine and Biology Society, 2009 pp. 3213-3216, Sep. 2009.

D.J. Yeager, J. Holleman, R. Prasad, J.R. Smith, B.P. Otis,"NeuralWISP: a wirelessly powered neural interface with 1 m range," IEEE Trans. on Biomedical Circuits and Systems, vol. 3, No. 6, Dec. 2009 pp. 379-387.

D. Fang, H. Qu and H. Xie, "A 1mW Dual-Chopper Amplifier for a 50-/spl mu/g/spl radic/Hz Monolithic CMOS-MEMS Capacitive Accelerometer," in Proc. Symp. VLSI Circuits 2006, pp. 59-60.

L. He, Y. P. Xu and M. Palaniapan, "A CMOS readout circuit for SOI resonant accelerometer with 4-μg bias stability and 20-μg/√Hz resolution," IEEE J. Solid-State Circuits, vol. 43, No. 6, pp. 1480-1490, Jun. 2008.

Bahl, (2003) "Wire Inductors," Lumped Elements for RF and Microwave Circuits, Artech House, Inc. Norwood MA, p. 146-150.

B. Razavi, RF Microelectronics, Prentice Hall Series, 1998, pp. 11-50.

T. Morrison et al. (2010) "The Bumblebee: A 0.3 gram, 560 μW, 0.1 cm3 Wireless Biosignal Interface with 10-m range," in IEEE 47th DAC/ISSCC Student Design Contest.

J. Pandey (2011) "Ultra-low Power Radio Techniques for Body Worn Devices," Dissertation Publication No. 3452704.

Y. Liao et al. (2011) "A Fully Integrated CMOS Accelerometer Using Bondwire Inertial Sensing," IEEE Sensors Journal, vol. 11, No. 1, pp. 114-122.

J. Pandey et al. (May 23-25, 2010) "A 90 μW MICS/ISM Band Transmitter with 22% Global Efficiency," 2010 IEEE Radio Frequency Integrated Circuits Symposium, Anaheim, CA, pp. 285-288.

* cited by examiner

METHODS AND SYSTEMS FOR DETECTING ACCELERATION USING BONDWIRES

RELATED APPLICATIONS

This application claims priority to U.S. Provisional Patent Application Ser. No. 61/316,784, entitled Frequency Multiplying Transceiver, filed Mar. 23, 2010, which is incorporated by reference.

BACKGROUND

Generally, an accelerometer is a device that may be configured to measure the acceleration of a given object. For example, typical accelerometers may be configured so as to measure the specific force, or g-force, experienced by such an object. A measurement of g-force provides an indication of the acceleration of the object relative to its inertial frame of reference.

As technologies involving guidance, navigation, control, and/or other motion-sensitive applications have become more pervasive, so too has the demand for accelerometers. Recently, accelerometers have been incorporated into many types of mass-produced commercial products, such as automobiles, pedometers, mobile phones, PDAs, and gaming consoles. As may be expected, as the degree of precision of a given accelerometer increases, typically so too does the design cost, manufacturing cost, and/or size of the accelerometer. On the other hand, if a high degree of precision is not required from a given accelerometer application, the size and cost of such an accelerometer may tend to be, respectively, relatively small and low. Many emerging technologies, including those involving the mass production of consumer products, place a relatively greater value on small size and low cost as compared to precision of accelerometers.

Accelerometers may generally take on many forms. In one common example, accelerometers may include an acceleration-detection component that measures some value indicative of a change in acceleration and then provides that measurement to a separate readout component for processing and/or analysis. Such an acceleration-detection component may include one or more of a variety of physical transduction mechanisms that convert physical motion of an object associated with acceleration into a processable signal potentially via microelectromechanical systems (MEMs) having one or more of capacitive, piezoelectric, optical and tunneling technologies.

While use of such MEMs technologies in accelerometers generally provides for stable and accurate acceleration detection, fabrication costs of such MEMs are typically relatively high due to their complicated structures and large size. Further, micromachining techniques used to integrate MEMs devices with integrated circuits (ICs) utilize nonstandard manufacturing technologies resulting in costs above and beyond those involved with manufacturing devices using standard IC processes.

The ability to integrate an accelerometer into an IC using standard techniques may provide many benefits, including accurate/reliable sensing of device orientation, shock detection/prediction, and motion detection at low cost.

SUMMARY OF THE INVENTION

Disclosed herein are methods, systems, and devices that provide for the integration of an accelerometer into an integrated circuit (IC) using standard, low cost, materials and manufacturing techniques.

According to the disclosed methods, systems, and devices, an acceleration-sensor element may include standard IC bonding wires that are configured so as to operate as inertial sensors. The acceleration-sensor element may then be coupled to a sensor-readout element, which may include a low-power circuit that is configured so as to process a signal that is representative of an acceleration detected by the acceleration-sensor element. The sensor-readout element may then provide an output signal that indicates the acceleration detected by the acceleration-sensor element in a form that may easily be used by applications that require accelerometer functionality.

Advantageously, the disclosed methods, systems, and devices may be used to implement an accelerometer into standard IC technologies. Further, the disclosed, methods, and systems may implement accelerometers at low costs by, among other things, utilizing using common bondwires that may otherwise be used to make interconnections between ICs and printed circuit boards (or other electronics, as necessary). More particularly, the disclosed methods, systems, and devices may capitalize on the fact that, under acceleration, freestanding bondwires exhibit mechanical deflection that may be used for purposes of inferring an acceleration of an object to which the bondwires are affixed.

One embodiment of the disclosed methods, systems, and devices may take the form of a system that includes a first electrically-conductive wire and a second electrically-conductive wire, where the first wire and the second wire are electromagnetically coupled; and a sensor oscillator, where the sensor oscillator is coupled to the first wire and the second wire, and where the sensor oscillator is configured to output a sensor-oscillator signal that is frequency modulated based on a change in complex impedance between the first wire and the second wire, where the change in complex impedance is due to a displacement of the first wire relative to the second wire.

Generally, the first electrically-conductive wire and the second electrically-conductive wire may be standard IC bondwires. Other examples of the first wire and the second wire may exist as well. For purposes of explanation, the first wire, the second wire, and the sensor oscillator may be described as included in the acceleration-sensor element of the accelerometer disclosed herein.

The first wire and the second wire may take many forms and may be arranged in a variety of manners. As one example, the first wire and the second wire may each include a body having first end and a second end, where the first end of the first wire and the first end of the second wire are each coupled to an alternating current (AC) ground, and wherein the second end of the first wire and the second end of the second wire are each coupled to the sensor oscillator. In accordance with such an example, the body of the first wire and the body of the second wire may be free standing. Thus, the first wire and the second wire may undergo mechanical deflection under acceleration, resulting in the relative displacement between the first wire and the second wire that induces the change in complex impedance between the first wire and the second wire.

Further, the first wire and the second wire may possess one or more different characteristics. For example, the first wire and the second wire may differ in characteristics including a young's modulus, a density, and/or a physical dimension. As one specific example the first wire may be a gold wire, and the second wire may be an aluminum wire. As another specific example, at least one of the first wire and the second wire may be insulated. Other examples are possible as well. Such differences in characteristics between the first wire and the second wire may be used so as to control the operational characteristics of the accelerometer or, more specifically, the operational characteristics of the acceleration-detection element.

Further still, the sensor oscillator of the acceleration-sensor element may be coupled to a sensor-readout element that, itself, may take many forms. For example, the sensor-readout element may include a mixer configured to receive the frequency-modulated sensor-oscillator signal from the sensor oscillator, receive a local-oscillator signal from a local oscillator, mix the frequency-modulated sensor-oscillator signal with the local-oscillator signal so as to provide an output signal comprising sum and difference frequencies, and filter the output signal so as to extract the difference frequency and thereby provide a downconverted frequency-modulated sensor signal.

And even further still, the sensor-readout element may include a first tuning element and a second tuning element. The first tuning element may be coupled to the sensor oscillator, where the first tuning element is configured to tune the sensor oscillator. The second tuning element may be coupled to the mixer oscillator, where the second tuning element is configured to tune the local oscillator.

Another embodiment of the disclosed methods, systems, and devices may take the form of a method that includes frequency modulating a sensor oscillator based on a change in complex impedance between the first electrically-conductive wire and the second electrically-conductive wire, where the first wire and the second wire are electromagnetically coupled, and where the change in complex impedance is due to a displacement of the first wire relative to the second wire.

These as well as other aspects and advantages will become apparent to those of ordinary skill in the art by reading the following detailed description, with reference where appropriate to the accompanying drawings.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Introduction

Described herein are aspects of an accelerometer, which may be arranged, generally, to detect the specific acceleration of a device using at least two electromagnetically coupled electrically-conductive wires that are housed within the accelerometer. In certain arrangements, the electrically-conductive wires may be what are commonly referred to as bondwires; that is wire bonding that is typically used for making interconnections between an integrated circuit (IC) and a printed circuit board (PCB) and/or other electronic packages. In accordance with some aspects of the accelerometer described herein, the use of bondwires may advantageously provide for the convenient, low cost, and efficient integration of accelerometer functionality into a wide variety of ICs using standard IC manufacturing techniques.

For purposes of explanation, certain aspects of the description herein may refer to an acceleration-sensor element, and certain other aspects of the description herein may refer to a sensor-readout element. Thus, at times reference may be made to aspects, devices, and/or functions that may be associated with the acceleration-sensor element, and at times reference may be made to aspects, devices and/or functions that may be associated with the sensor-readout element. However, it should be understood that such descriptions are for purpose of example and explanation only and that any of the aspects, devices, and/or functions of the accelerometer described herein may be carried out by any suitable circuit, device, and/or element which may be integrated or distributed, in various ways, internal or external to the accelerometer described herein.

II. Example System Configuration

Figure 1:
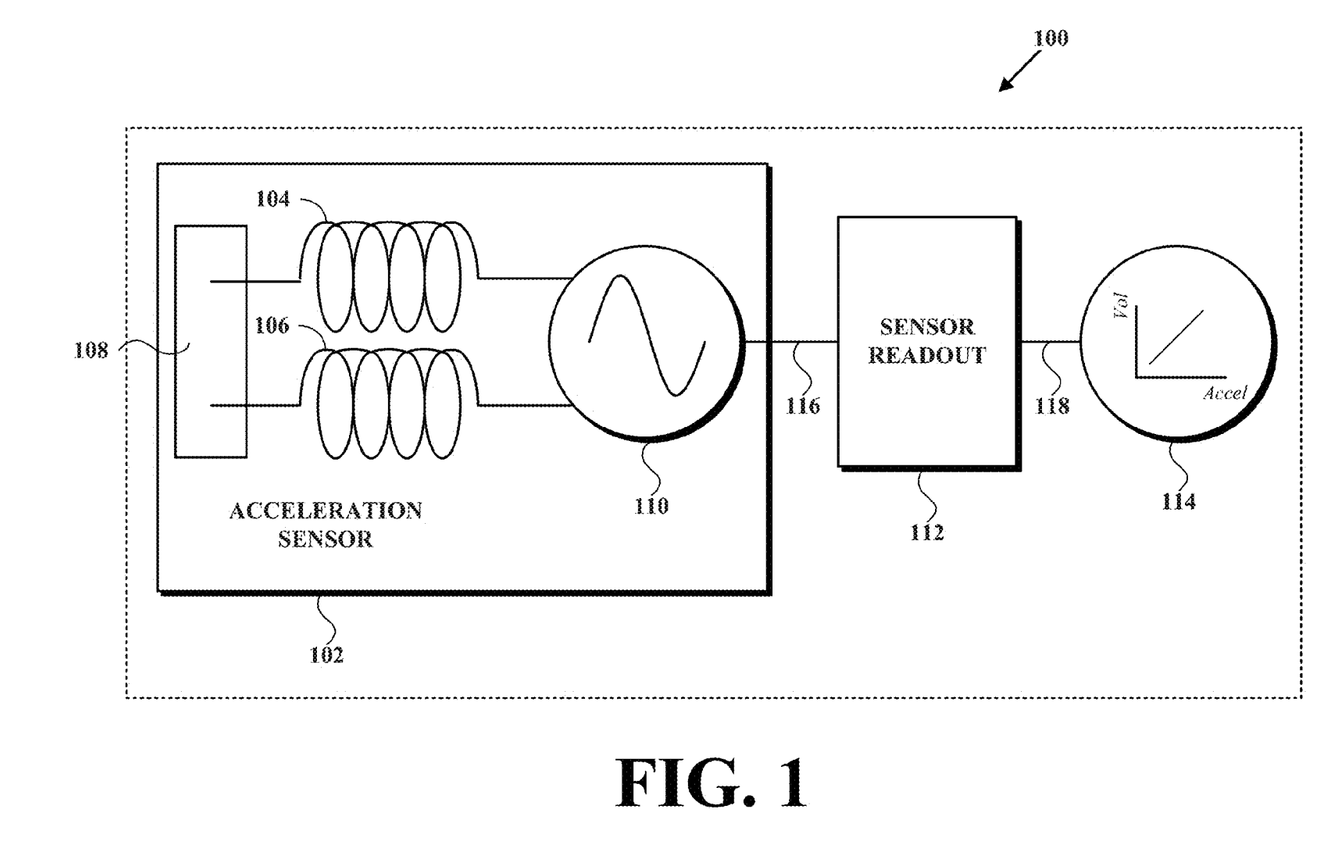
FIG. 1 depicts a simplified block diagram of an example accelerometer including an example acceleration-sensor element and an example sensor-readout element.

FIG. 1 depicts a block diagram of functional elements included in example accelerometer 100, which may be arranged so as to carry out the functions described below with respect to FIGS. 4A and 4B. As shown, accelerometer 100 may include acceleration-sensor element 102 and sensor-readout element 112, which may be coupled together. As described further below, accelerometer 100 may include various circuitry and/or other elements as well or instead. For example, sensor-readout element 112 may be coupled to output element 114, which may be internal or external to accelerometer 100. Further, each of acceleration-sensor element 102, sensor-readout element 112, and output element 114 may include one or more circuits, devices, and/or other elements. Although the various elements of accelerometer 100 may be described herein as separate elements, it should be understood that the elements could just as well be physically integrated together or distributed in any suitable manner.

a. Example Acceleration-Sensor Element

As shown in FIG. 1, accelerometer 100 may include acceleration-sensor element 102. Acceleration-sensor element 102 may include, among other things, first electrically-conductive wire 104, second electrically-conductive wire 106, alternating current (AC) ground 108, and sensor-oscillator 110. As noted above, acceleration-sensor element 102 may generally be configured to output sensor-oscillator signal 116 that is frequency modulated based on a change in complex impedance between first wire 104 and second wire 106, where the change in complex impedance is due to a displacement of first wire 104 relative to second wire 106.

In FIG. 1, first wire 104 and second wire 106 are depicted as inductors, however this is only for purposes of indicating that first wire 104 and second wire 106 may have inductive properties. First wire 104 and second wire 106 may have other electrical properties including, but not limited to, resistive and/or capacitive properties. More particularly, first wire 104 and second wire 106 may be inductively, capacitively, magnetically, or otherwise electromagnetively coupled. As also shown in FIG. 1, a respective first end of first wire 104 and second wire 106 may be coupled to AC ground 108, and a respective second end of first wire 104 and second wire 106 may be coupled to sensor oscillator 110.

AC ground 108 may generally be configured such that alternating currents (AC) present in a circuit that includes first wire 104, second wire 106, and sensor oscillator 110 are allowed to flow to ground, whereas as direct currents (DC) are prevented from flowing to ground. Such DC currents may be introduced in first wire 104 and second wire 106 to provide power to sensor oscillator 110. On the other hand, such AC currents may be introduced in first wire 104 and second wire 106 by sensor oscillator 110, with shifts in the frequency of such AC currents induced by changes in complex impedance arising from relative displacements of first wire 104 and second wire 106.

Figure 2:
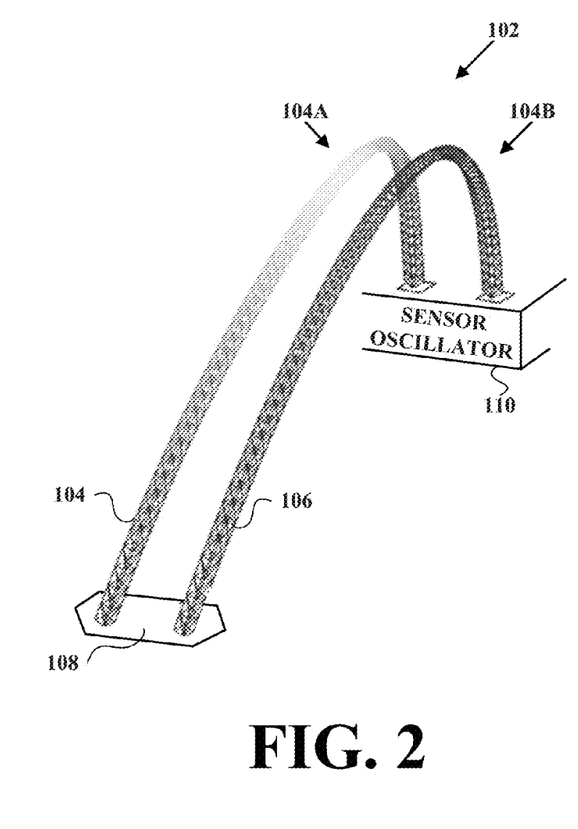
FIG. 2 depicted an example first wire and an example second wire in accordance with the example acceleration-sensor element of the example accelerometer.

FIG. 2 provides an example depiction of first wire 104 and second wire 106 in accordance with example acceleration-sensor element 102. As noted above, in a typical arrangement of accelerometer 100 first wire 104 and second wire 106 may each be a bondwire. Such bondwires may be, for example (but not limited to), one to five millimeters long, have a diameter that is roughly twenty-six micrometers, and may be composed of gold or aluminum. In a common arrangement, first wire 104 and second wire 106 may trace a shape of an approximately parabolic arch. In this way, under acceleration, first wire 104 and second wire 106 may exhibit mechanical deflection that is especially prominent at apex 104A and apex 104B, respectively, of the parabolic arch. First wire 104 and second wire 106 may, of course, assume other shapes, materials (particularly other electrically-conductive materials), and/or other characteristics as well.

The characteristics (including, but not limited to, length, other dimensions, material, and shape) of first wire 104 and second wire 106 described above are for purposes of example only. First wire 104 and second wire 106 may assume any of a variety of additional and/or alternative characteristics. In fact, the magnitude of the deflection of first wire 104 and/or second wire 106 under a given acceleration may vary according to the geometry, material, and/or other characteristic of either of first wire 104 and second wire 106. Accordingly, by controlling the geometry, material, and/or other characteristics of first wire 104 and second wire 106, the relative displacement of first wire 104 and second wire 106 under acceleration may be controlled. Thereby, the change in complex impedance that is induced between first wire 104 and second wire 106 under acceleration may also be controlled and acceleration-sensor element 102 may be calibrated so as to suit a particular application for which accelerometer 100 may be employed.

One particular characteristic that may be used to calibrate acceleration-sensor element 102 is the density of first wire 104 and second wire 106. Another particular characteristic that may be used to calibrate acceleration-sensor element 102 is the elasticity (i.e. young's modulus) of first wire 104 and second wire 106. For example, first wire 104 may be a relatively dense and elastic gold (Au) wire and second wire 106 may be a relatively less dense and stiff aluminum (Al) wire. For purposes of example and explanation, the table below shows the relevant mechanical properties of such an example first wire 104 and second wire 106.

| Characteristic | First Wire 204 | Second wire 106 |
| --- | --- | --- |
| Material | Gold (Au) | Aluminum (Al) |
| Young's Modulus (flexibility) | 78 GPa | 70 GPa |
| Density | 19.3 g/cm$^3$ | 2.7 g/cm$^3$ |

The particular example provided above with respect to first wire 104 as a gold wire and second wire 106 as an aluminum wire may be characterized by a much greater deflection of the second aluminum wire than the first gold wire given that gold is approximately 7.14 times denser than aluminum. Note that such discrepancy in displacement may exist despite the fact that gold and aluminum possess somewhat similar flexibility characteristics (i.e., a similar young's modulus). Thus, as particularly exemplified by the case of gold and aluminum bondwires, the change in complex impedance induced between first wire 104 and second wire 106, and thus the frequency modulation of sensor oscillator 110, may generally be controlled according to the characteristics of first wire 104 and second wire 106. For purposes of explanation, examples of a few such additional characteristics and considerations that may be relevant to the control of the relative displacement of first wire 104 and second wire 106 are provided below.

As one example, as the length and height of first wire 104 and second wire 106 increase, generally, the amount of mass suspended by the respective wire increases, causing a larger force to be applied to the respective wire under a given acceleration. As a result, the deflection of the respective wire will increase as the length and height of the respective wire increases.

As another example, the bandwidth of acceleration-sensor element 102 (that is the extent of acceleration that is accurately detectable by acceleration-sensor element 102) will be dependent on the mechanical resonant frequency of first wire 104 and second wire 106. Generally, for example, a higher resonant frequency of first wire 104 and second wire 106 will correspond to a greater bandwidth of acceleration detection. Notably, the mechanical resonant frequency of a given bondwire will be inversely proportional to the length, but, to a lesser extent, will be proportional to the radius, of the bondwire used in acceleration-sensor element 102.

Ultimately, there exists a tradeoff between sensitivity and bandwidth of acceleration-sensor element 102. Sensors using longer bondwires have a lower resonant frequency (and thus bandwidth) but will be more sensitive due to larger displacements of the bondwires. On the other hand sensors using short bondwires have a higher resonant frequency (and thus bandwidth) but will be less sensitive due to smaller displacements of the bondwires. As noted above, these and other characteristics of the bondwires may be controlled and optimized so as to suit the desired application of accelerometer 100.

As yet another example of varying characteristics of first wire 104 and second wire 106, at least one of first wire 104 and second wire 106 may be insulated. Such insulation may vary the electromagnetic coupling of first wire 104 and second wire 106 and therefore may be an additional characteristic that may be controlled and optimized so as to suit the desired application of accelerometer 100.

b. Example Sensor-Readout Element

Referring back to FIG. 1, accelerometer 100 may include sensor-readout element 112. Sensor-readout element 112 may, generally, be configured to mix frequency-modulated sensor-oscillator signal 116 with a local oscillator signal so as to provide an output signal comprising sum and difference frequencies, and filter the output signal so as to extract the difference frequency and thereby provide a downconverted frequency-modulated sensor signal.

Figure 3:
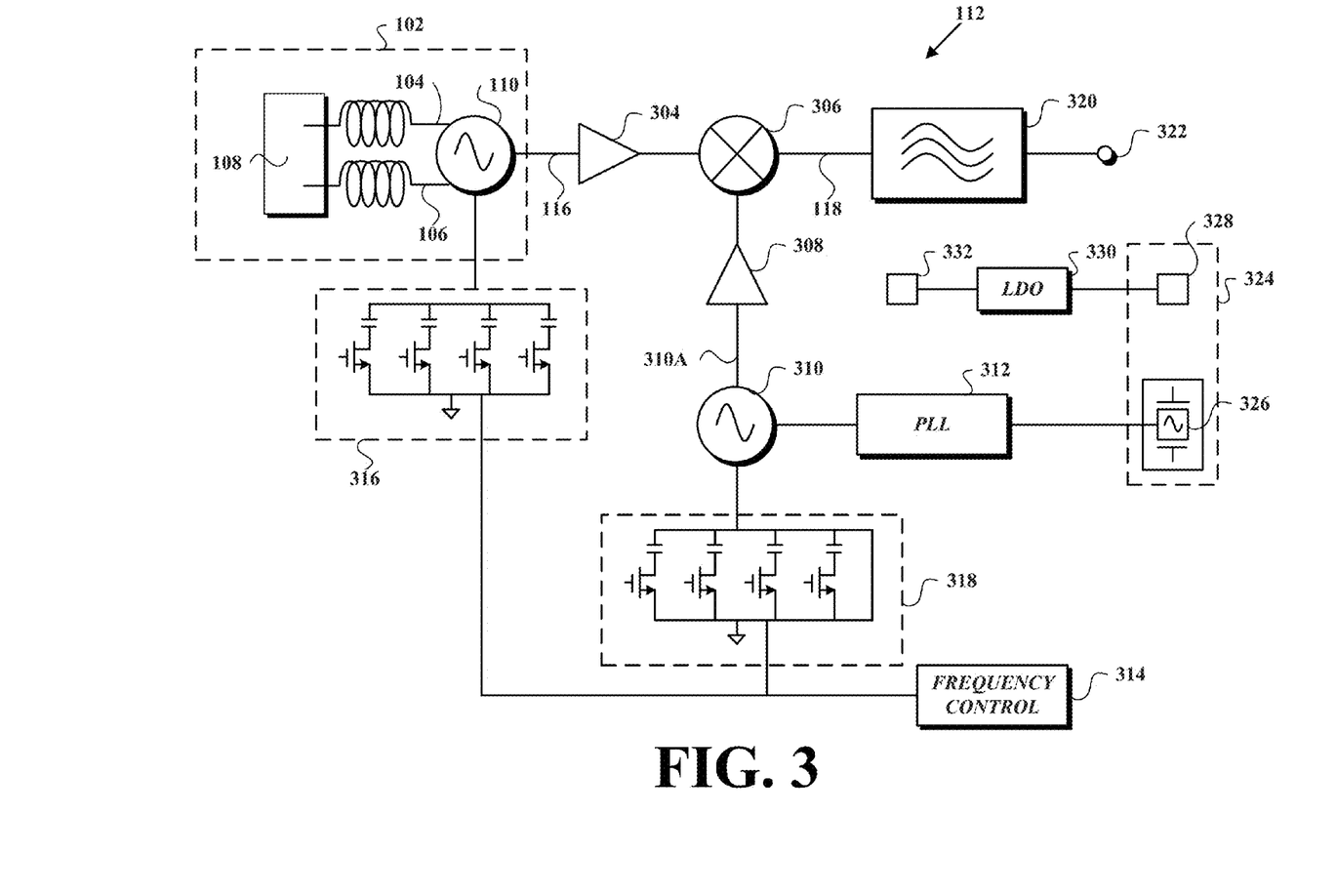
FIG. 3 depicts a simplified block diagram of an example sensor-readout element of the example accelerometer.

FIG. 3 depicts a simplified block diagram of example sensor-readout element 112 of example accelerometer 100. For purposes of explanation, sensor-readout element 112 may be generally configured so as to downconvert (and, may additionally, decode and digitize) frequency-modulated sensor-oscillator signal 116 in accordance with conventional frequency modulation (FM) architectures. Thus, FIG. 3 depicts circuitry, devices, and/or other components that may be accordingly arranged and/or may be configured to carry out the functions described above with respect to method 120.

As shown in FIG. 3, acceleration-sensor element 102, including first wire 104, second wire 106, AC ground 108, and sensor oscillator 110, may be coupled to various circuitry, devices, and/or other devices included in sensor-readout element 112. As an initial matter, mixer 306 may be coupled to sensor oscillator 110 such that mixer 306 is configured to receive frequency-modulated sensor-signal 116 from sensor oscillator 110. Further, mixer 306 may be coupled to local oscillator 310 such that mixer 306 is also configured to receive local-oscillator signal 310A from local oscillator 310.

Generally, mixer 306 provides output signal 118 which includes the sum and difference frequencies of the product of frequency-modulated sensor-signal 116 and local-oscillator signal 310A. In this way, mixer 306 may downconvert frequency-modulated sensor-signal 116 by providing the difference frequency in output signal 118. Further to this end, lowpass filter 320 may be employed in line with mixer 306 so as to extract the difference frequency from output signal 118 and provide downconverted frequency-modulated sensor signal 322. Downconverted frequency-modulated sensor signal 322 may thus by provided to other circuitry, devices and/or elements, such as output element 114, in a manner that will be convenient and/or efficient for use by other such components.

Sensor-readout element 112 further includes phase-locked loop (PLL) 312 coupled to local oscillator 310 which enables local oscillator 310 to provide a stable, locked, local-oscillator signal 310A, having a given frequency, to mixer 306. PLL 312 may provide a stable frequency based on any suitable reference oscillator circuit 326 which may be, for example, one of a variety of crystal oscillators, for instance a quartz oscillator. Additional examples of reference oscillator circuits may include any one, or combination of, solid state and/or microclectromechanical system (MEMs) technologies. Other examples of reference oscillator circuits, including other types of crystal oscillators, exist as well.

Reference-oscillator circuit 326 may be arranged external to sensor-readout element 110 (as indicated by external devices 324). Similarly, voltage supply 328 may be provided as an additional one of external devices 324. Voltage supply 328 may be coupled to a low-dropout regulator (LDO) 330 that is included in sensor-readout element 112, which LDO may provide a voltage regulation function for the power supplied to and used by sensor-readout element 112 based on voltage supply 328. In other words, the voltage supplied by voltage supply 328 may be converted, by LDO 330, into a clean voltage supply 332 that is internal to sensor-readout element 112.

Also shown in FIG. 3 is capacitor bank 316 and capacitor bank 318. Capacitor banks 316 and 318 may be used in combination with frequency-control element 314 to control the oscillation frequency of sensor oscillator 110 and local oscillator 310, respectively. In the example shown in FIG. 3, each of capacitor banks 316 and 318 are 4-bit capacitor banks; however, other examples of frequency-control elements, including other capacitor banks, may exist as well. Frequency-control element 314 may be any circuit, device, and/or other element that is communicatively coupled to sensor-readout element 112 and arranged to communicate bits, or other control information, required for control of capacitor banks 416 and 418. Frequency-control element 414 may be communicatively coupled to sensor-readout element 112 in accordance with an inter-integrated circuit (I²C) communication bus. Other examples of frequency control mechanisms, including communication buses that may be used in accordance with such frequency control mechanisms, exist as well.

Note that capacitor bank 316 may be used to tune sensor oscillator 110 in the event that the free-running frequency of sensor oscillator 110 drifts from the mechanical resonant frequency of first wire 104 and second wire 106. As one example, sensor oscillator 110 may be tuned to account for frequency drifts in sensor oscillator 110 due to pressure, volume, and/or temperature (PVT) variations. Also note that capacitor bank 318 may be used to tune local oscillator 310 for similar reasons. However, in the event that local oscillator 310 is coupled to PLL 312, it may be the case that the frequency of local oscillator 310 may be effectively controlled by PLL 312 without the need for capacitor bank 318.

Also shown in FIG. 3 is buffer element 304 and buffer element 308. Buffer elements 304 and 308 may generally function so as to isolate each of sensor oscillator 110 and local oscillator 310 from mixer 306, and each other, and thereby may reduce any undesirable effects that may arise as a result of possible electrical coupling of sensor oscillator 110, mixer 306, and local oscillator 310. For example buffers 304 and 308 may reduce any potential frequency pulling that local oscillator 310 may induce in sensor oscillator 110. Buffers 304 and 308 may provide other benefits as well.

c. Example Output Element

Referring again back to FIG. 1, example output element 114 may include any circuitry, device, and/or other element that is capable of further processing or using output element 114 in accordance with a given application. As one example output element 114 may include demodulation circuitry configured to receive and demodulate downconverted frequency-modulated sensor signal 322. In this way output element 114 may be configured to provide a signal that that directly indicates an amount of acceleration experienced by acceleration-sensor element 102. For instance, output element 114 may provide a signal is characterized by a voltage that linearly represents an acceleration of acceleration-sensor element 102. Other examples, and/or functions that may be performed by output element 114, are possible as well.

III. Example Accelerometer Functions

As noted above, the accelerometer described herein may include both an acceleration-sensor element and a sensor-readout element. Such an acceleration-sensor element and sensor-readout element may be configured to carry out, respectively, various acceleration-sensing functions and various sensor-readout functions. Below, such respective functions are discussed separately, in turn, with respect to FIGS. 4A and 4B. However, it should be understood that the functions of the acceleration-sensor element and the sensor-readout element are discussed separately for purposes of explanation and example only. Any such functions may be carried out by the accelerometer described herein separately, or in combination, using any suitable circuit, device, and/or other element.

a. Example Acceleration-Detection Functions

Figure 4A:
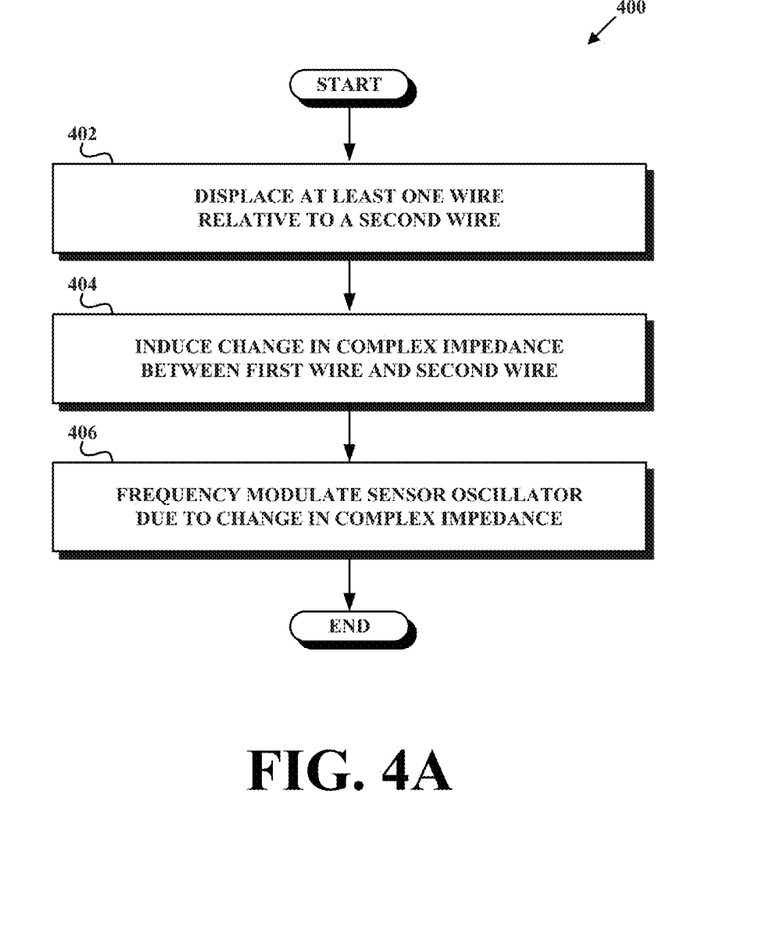
FIG. 4A depicts a flow chart of an example method that may be carried out by the example acceleration-sensor element of the example accelerometer.

FIG. 4A depicts a flow chart of an example method that may be carried out by acceleration-sensor element 102 of example accelerometer 100. Method 400 begins at step 402 with the displacement of at least one electrically-conductive wire 104 relative to a second electrically-conductive wire 106.

The displacement of first wire 104 relative to second wire 106 may be due to an acceleration of acceleration-sensor element 102. That is, one or more of the first and second free-standing wires may be arranged such that, under a given acceleration the deflection of first wire 104 is different from second wire 106. According to such an arrangement, therefore, the displacement of first wire 104 relative to second wire 106 may be different under a given acceleration.

At step 404, the relative displacement between first wire 104 and second wire 106 induces a change in complex impedance between the first wire 104 and second wire 106. As described above, the first wire 104 may be a first electrically-conductive wire and second wire 106 may be second electrically-conductive wire. Further, first wire 104 and second wire 106 may be arranged such that they are electromagnetically coupled. Thus, given the coupling of first wire 104 and second wire 106, upon a relative displacement of first wire 104 and second wire 106 a change in complex impedance may be induced between first wire 104 and second wire 106. Inclusive of such a change in complex impedance, a change in mutual capacitance may be induced between first wire 104 and second wire 106. Also inclusive of such a change in complex impedance, a change in mutual inductance may be induced between first wire 104 and second wire 106.

At step 406, sensor oscillator 110 is frequency modulated due to the change in complex impedance induced at step 104. Sensor oscillator 110 may be generally configured to oscillate at a free running, or standard oscillation frequency, which may be tuned to the resonant frequency of the freestanding first wire 104 and second wire 106. And as described above, first wire 104 and second wire 106 may be coupled to sensor oscillator 110.

Sensor oscillator 110 may therefore be configured, in accordance with being coupled to first wire 104 and second wire 106, such that the change in complex impedance introduced in the first wire 104 and second wire 106 in accordance with step 404 may also introduce a change in complex impedance of sensor oscillator 110. This change in complex impedance in sensor oscillator 110 may interject a frequency deviation into the free-running frequency of sensor oscillator 110. In this way, a frequency modulation (FM) of sensor oscillator 110 may be accomplished as a result of the relative displacement of first wire 104 and second wire 106. Thereby, acceleration-sensor element 102, by way of sensor oscillator 110, may provide frequency-modulated sensor-oscillator signal 116 that is representative of an acceleration experienced by acceleration-sensor element 102.

b. Example Sensor-Readout Functions

Figure 4B:
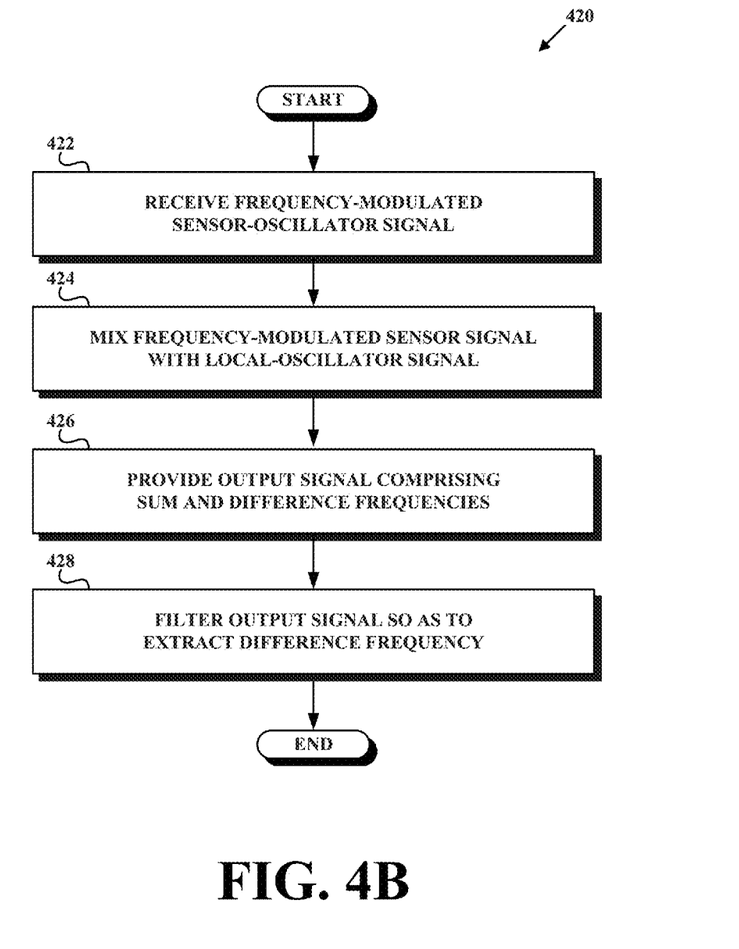
FIG. 4B depicts a flow chart of an example method that may be carried out by the example sensor-readout element of the example accelerometer.

FIG. 4B depicts a flow chart of an example method that may be carried out by example sensor-readout element 112 of example accelerometer 100. Method 420 begins at step 422 with sensor-readout element 112 receiving frequency-modulated sensor-oscillator signal 116 from acceleration-sensor element 102. Thus, frequency-modulated sensor-oscillator signal 116 may be generated, created, or otherwise provided in accordance with any of the functions described above with respect to method 400.

At step 424 the sensor-readout element 112 mixes frequency-modulated sensor-oscillator signal 116 with local-oscillator signal 310A. In accordance with step 424, mixer 306 may be configured to receive frequency-modulated sensor-oscillator signal 116 from sensor oscillator 110 and may also be configured to receive local-oscillator signal 310A from local oscillator 310. Frequency-modulated sensor-oscillator signal 116 and local-oscillator signal 310A may be mixed in accordance with any suitable signal mixing technique.

At step 426, sensor-readout element 112 provides, as an output of mixer 306, output signal 118 that includes the sum and difference frequencies of the mixed frequency-modulated sensor-oscillator signal 116 and local-oscillator signal 310A. That is, mixer 306 may be implemented in any passive or active manner so as to produce an output signal that includes the sum and difference frequencies of frequency-modulated sensor-oscillator signal 116 and the local-oscillator signal 310A.

And at step 428, sensor-readout element 112, by way of filter 320, filters output signal 118 so as to extract the difference frequency of output signal 118 and thereby provides downconverted frequency-modulated sensor-oscillator signal 322. The extracted difference frequency may then be provided by sensor-readout element 112 as downconverted frequency-modulated sensor-oscillator signal 322 to enable accurate and/or efficient demodulation of frequency-modulated sensor-oscillator signal 116, which was initially provided by acceleration-sensor element 102.

While various functions that may be performed by the accelerometer disclosed herein have been described above, below is provided a description of circuits, devices, and/or other elements that may be included in an example accelerometer arranged to carry out such functions.

IV. Conclusion

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A system comprising:
   a first electrically-conductive wire and a second electrically-conductive wire, wherein the first wire and the second wire are electromagnetically coupled; and
   a sensor oscillator, wherein the sensor oscillator is coupled to the first wire and the second wire, and wherein the sensor oscillator is configured to output a sensor-oscillator signal with a frequency that changes based on a change in complex impedance between the first wire and the second wire, wherein the change in complex impedance is due to a displacement of the first wire relative to the second wire.

2. The system of claim 1, wherein the first wire and the second wire each comprise a body having first end and a second end, wherein the first end of the first wire and the first end of the second wire are each coupled to an alternating current (AC) ground, and wherein the second end of the first wire and the second end of the second wire are each coupled to the sensor oscillator.

3. The system of claim 1, wherein the first wire comprises a first material that has at least one characteristic that differs from a second material of the second wire, the at least one characteristic comprising a Young's modulus or a density.

4. The system of claim 1, wherein the first wire comprises gold, and wherein the second wire comprises aluminum.

5. The system of claim 1, wherein the sensor oscillator is coupled to a sensor-readout element that comprises:
a mixer configured to (i) receive the sensor-oscillator signal from the sensor oscillator, (ii) receive a local-oscillator signal from a local oscillator, (iii) mix the sensor-oscillator signal with the local-oscillator signal so as to provide an output signal comprising sum and difference frequencies, and (iv) filter the output signal so as to extract the difference frequency and provide a downconverted frequency-modulated sensor signal.

6. The system of claim 5, wherein the sensor-readout element further comprises at least one of:
a first tuning element coupled to the sensor oscillator, wherein the first tuning element is configured to tune the sensor oscillator; and
a second tuning element coupled to the local oscillator, wherein the second tuning element is configured to tune the local oscillator.

7. The system of claim 5, wherein the sensor-readout element further comprises:
a first buffer element coupled between the sensor oscillator and the mixer; and
a second buffer element coupled between the local oscillator and the mixer.

8. The system of claim 1, wherein the first wire and the second wire are free standing and separated by a free space.

9. The system of claim 1, wherein the displacement of the first wire relative to the second wire is caused by movement of the system.

10. A method comprising:
changing a frequency of a sensor-oscillator signal outputted by a sensor oscillator based on a change in complex impedance between a first electrically-conductive wire and a second electrically-conductive wire, wherein the first wire and the second wire are electromagnetically coupled, and wherein the change in complex impedance is due to a displacement of the first wire relative to the second wire.

11. The method of claim 10, wherein the first wire and the second wire each comprise a body having first end and a second end, wherein the first end of the first wire and the first end of the second wire are each coupled to an alternating current (AC) ground, and wherein the second end of the first wire and the second end of the second wire are each coupled to the sensor oscillator.

12. The method of claim 10, wherein the first wire comprises a first material that has at least one characteristic that differs from a second material of the second wire, the at least one characteristic comprising a Young's modulus or a density.

13. The method of claim 10, wherein the first wire comprises gold, and wherein the second wire comprises aluminum.

14. The method of claim 10, the method further comprising:
mixing the sensor-oscillator signal with a local-oscillator signal provided by a local oscillator so as to provide an output signal comprising sum and difference frequencies; and
filtering the output signal so as to extract the difference frequency and provide a downconverted frequency-modulated sensor signal.

15. The method of claim 14, the method further comprising at least one of:
tuning the sensor oscillator using a first tuning element; and
tuning the local oscillator using a second tuning element.

16. The method of claim 14, wherein the mixing is performed by a mixer, the method further comprising:
providing a first buffer element between the sensor oscillator and the mixer, and
providing a second buffer element between the local oscillator and the mixer.

17. The method of claim 10, wherein the first wire and the second wire are free standing and separated by a free space.

18. The method of claim 10, wherein the displacement of the first wire relative to the second wire is caused by movement of a system that comprises the first wire and the second wire.

19. A system comprising:
a first electrically-conductive wire and a second electrically-conductive wire, wherein the first wire and the second wire are electromagnetically coupled; and
a sensor oscillator, wherein the sensor oscillator is coupled to the first wire and the second wire, and wherein the sensor oscillator is configured to output a sensor-oscillator signal that is frequency modulated based on a change in complex impedance between the first wire and the second wire, wherein the change in complex impedance is due to a displacement of the first wire relative to the second wire, wherein the sensor oscillator is coupled to a sensor-readout element that comprises:
a mixer configured to (i) receive the frequency-modulated sensor-oscillator signal from the sensor oscillator, (ii) receive a local-oscillator signal from a local oscillator, (iii) mix the frequency-modulated sensor-oscillator signal with the local-oscillator signal so as to provide an output signal comprising sum and difference frequencies, and (iv) filter the output signal so as to extract the difference frequency and provide a downconverted frequency-modulated sensor signal;
a first tuning element coupled to the sensor oscillator, wherein the first tuning element is configured to tune the sensor oscillator; and
a second tuning element coupled to the local oscillator, wherein the second tuning element is configured to tune the local oscillator.

20. The system of claim 19, wherein the sensor-readout element further comprises:
a first buffer element coupled between the sensor oscillator and the mixer; and
a second buffer element coupled between the local oscillator and the mixer.

* * * * *